United States Patent [19]

Leppek et al.

[11] Patent Number: 4,750,125
[45] Date of Patent: Jun. 7, 1988

[54] VEHICLE WHEEL SLIP CONTROL SYSTEM

[75] Inventors: Kevin G. Leppek, West Bloomfield; Allen J. Walenty, Mt. Clemens, both of Mich.

[73] Assignee: General Motors Corporation, Detroit, Mich.

[21] Appl. No.: 917,779

[22] Filed: Oct. 10, 1986

[51] Int. Cl.$^4$ .............................................. B60T 8/32
[52] U.S. Cl. ..................................... 364/426; 180/197; 361/238; 303/95; 303/103
[58] Field of Search .................. 364/426, 565, 571; 180/197; 361/238; 303/92, 95, 96, 106, 107, 103, 111

[56] References Cited

U.S. PATENT DOCUMENTS

| | | | |
|---|---|---|---|
| 3,779,331 | 12/1973 | Burckhardt et al. | 180/197 |
| 4,439,832 | 3/1984 | Sato et al. | 364/426 |
| 4,484,280 | 11/1984 | Brugger et al. | 364/426 |
| 4,521,856 | 6/1985 | Phelps et al. | 364/426 |
| 4,566,737 | 1/1986 | Masaki et al. | 364/426 |
| 4,593,955 | 6/1986 | Leiber | 303/106 |
| 4,651,281 | 3/1987 | Masaki et al. | 364/426 |

Primary Examiner—Gary Chin
Attorney, Agent, or Firm—Howard N. Conkey

[57] ABSTRACT

An excessive slipping condition of one of the driven wheels of a vehicle that is indicative of a loss of traction of that wheel is sensed based on the difference in the driven wheel speeds. An increasing braking force is applied to the wheel with excessive slip to transfer driving torque through the differential to the non-slipping wheel so as to equalize the driven wheel speeds. In order to provide for compensation of the difference in wheel speeds that is not due to slip that occurs as the vehicle is turning, the speeds of the driven wheels are compensated based on the difference in speeds of the undriven wheels.

5 Claims, 3 Drawing Sheets

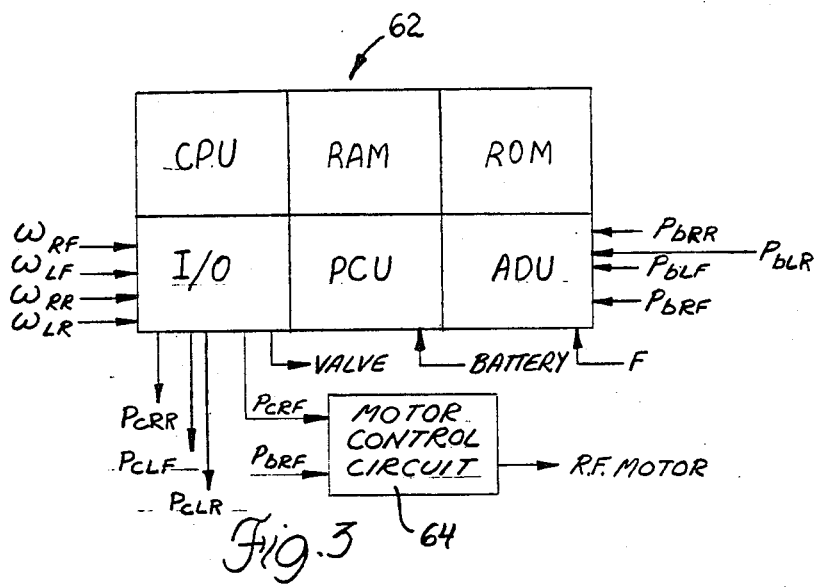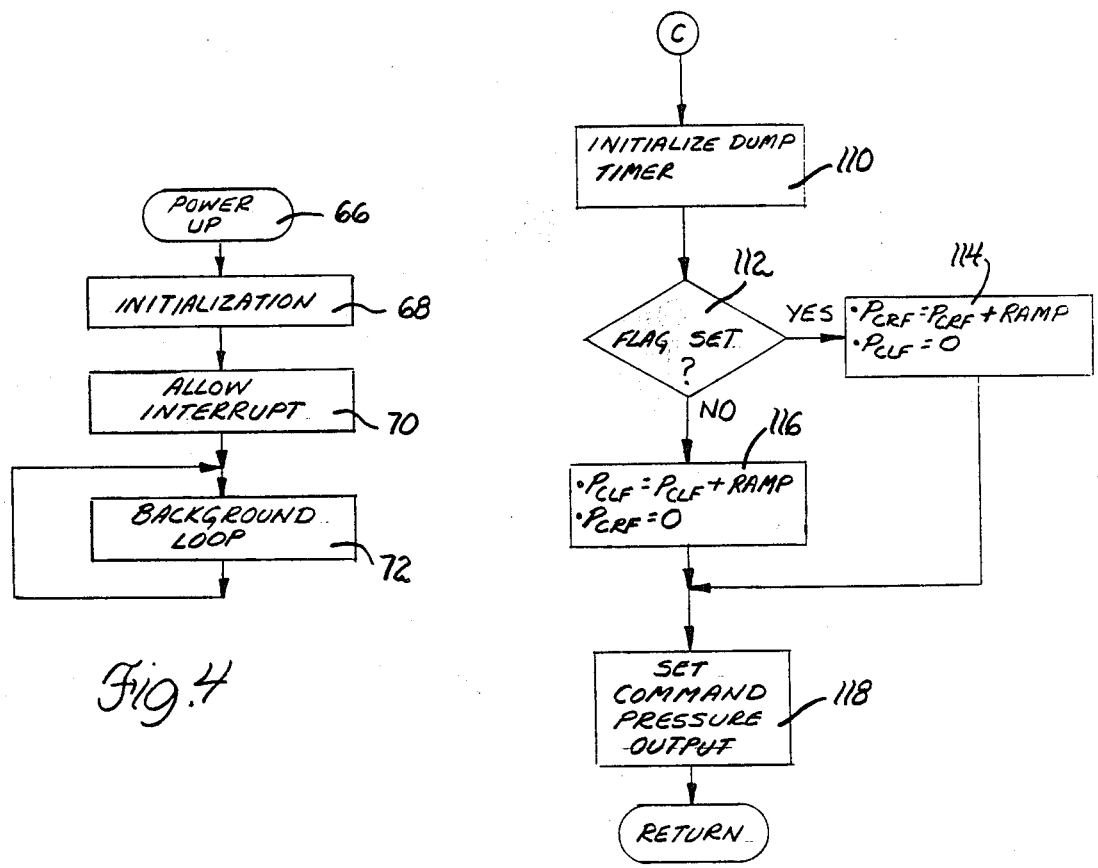

VEHICLE WHEEL SLIP CONTROL SYSTEM

This invention relates to a vehicle slip control system and more particularly to such a system wherein brake torque is used to evenly balance the speed of the driven wheels of a vehicle through the standard differential.

It is a common experience with automotive vehicles having a pair of wheels driven through a non-locking differential for the driven wheel experiencing the lowest coefficient of friction between the tire and road interface to lose traction and begin to slip. This may result from excessive engine output torque during vehicle acceleration or when one of the driven wheels suddenly encounters a low coefficient of friction road surface. When one of the driven wheels begins to slip, the engine torque output is transferred via the differential to the slipping wheel having the least traction thereby resulting in a severe reduction in the net driving torque for propelling the vehicle.

Systems have been proposed for sensing a difference in the speeds of the driven wheels and applying braking pressure to the wheel whose speed is greater than the other driven wheel by an amount indicating excessive wheel slip so as to transfer drive torque through the differential to the non-slipping wheel. In these systems, slip is generally determined based on the difference in speeds of the driven wheels. However, even without slip, a difference in speed of the driven wheels will occur when the vehicle is turning. This difference may result in an erroneous indication that one of the driven wheels has lost its traction and is slipping excessively.

In accord with this invention, an excessive slipping condition of one of the driven wheels that is indicative of a loss of traction of that wheel is sensed based on the difference in the driven wheel speeds. An increasing braking force is applied to the wheel with excessive slip to transfer driving torque through the differential to the non-slipping wheel so as to equalize the driven wheel speeds. In order to provide for compensation of the difference in wheel speeds that is not due to slip that occurs as the vehicle is turning, the speeds of the driven wheels are compensated based on the difference in speeds of the undriven wheels. This compensation eliminates the possibility of an erroneous indication of the loss of traction of the driven wheel on the outside of the vehicle turn.

The invention may be best understood by reference to the following description of a preferred embodiment and the drawings in which:

FIG. 3 is a diagram of the electronic controller of FIG. 1 that is responsive to the speeds of the vehicle wheels for limiting the slip between the driven wheels of the vehicle in accord with the principles of this invention; and FIGS. 4, 5a and 5b are diagrams illustrating the operation of the engine controller of FIG. 3.

Figure 1:
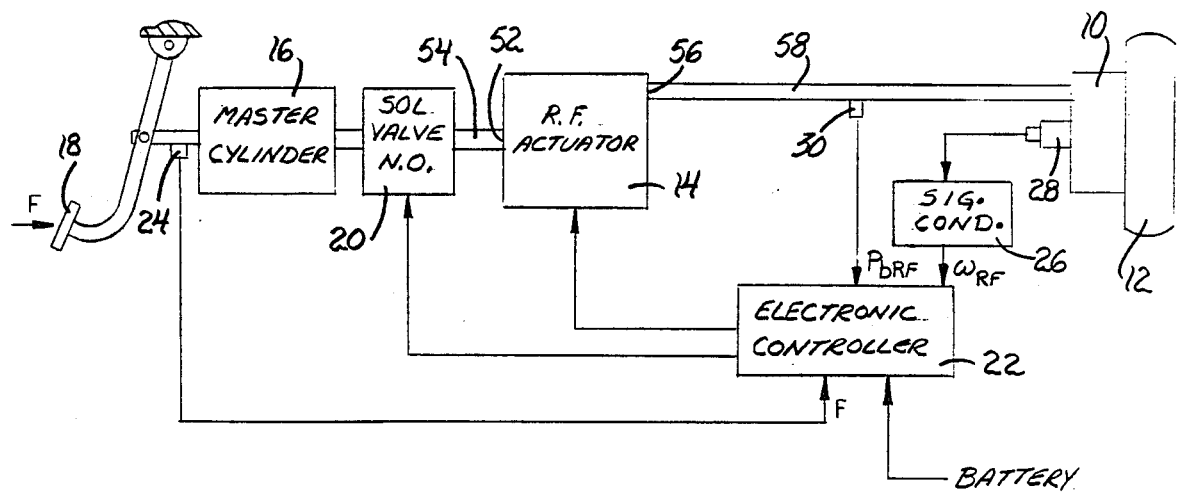
FIG. 1 is a general diagram of a system for limiting slip between the driven wheels of a vehicle in accord with the principles of this invention.

The invention is described with respect to a front wheel driven vehicle in which the front wheels are driven by the vehicle engine through a conventional unlocking differential. A general overview of the vehicle braking system is illustrated in FIG. 1. The braking elements associated with the right front driven wheel of the vehicle is illustrated, it being understood that the brakes of the remaining three wheels of the vehicle are controlled in identical manner.

A standard wheel brake 10 for the right front wheel 12 of the vehicle is actuated by controlled hydraulic pressure from one of two sources. The primary source is a motor driven actuator 14 and the secondary source is a standard master cylinder 16. A normally open electromagnetic valve 20 is energized when the actuator 14 is operative to control the hydraulic pressure to the brake 10 so as to decouple the master cylinder 16 and the brake pedal 18 from the hydraulic pressure output of the actuator 14. This prevents pressure feedback to the vehicle operator while brake pressure is controlled by the actuator 14. When the electromagnetic valve 20 is deenergized, the hydraulic pressure to the brake 10 may be modulated directly by the brake pedal 18 and the master cylinder 16.

The valve 20 is deenergized only during limited vehicle operating conditions such as during failed conditions of the primary hydraulic pressure source to permit brake pressure modulation by the master cylinder 16. At all other times, the valve 20 is energized to decouple the master cylinder 16 from the braking system.

An electronic controller 22 is responsive to the outputs of a brake pedal force sensor 24 providing a signal that is a measure of the operator applied pedal force F, signals representing the speeds of the vehicle wheels each provided by a respective signal conditioner such as the signal conditioner 26 that is responsive to a speed sensor 28 to provide the right front wheel speed $\omega_{RF}$ and signals representing the hydraulic brake pressures applied to the wheel brakes such as the right front wheel brake pressure $P_{bRF}$ provided by a pressure sensor 30. The electronic controller 22 is responsive to those signals to energize the valve 20 in the absence of a sensed failed condition of the primary hydraulic pressure source and control the hydraulic pressure applied to each of the wheel brakes via the individual brake actuators such as the actuator 14 controlling the hydraulic pressure $P_{bRF}$ to the right front wheel brake 10. As will be described, when the controller 22 senses that one of the driven wheels is experiencing excessive slip, a braking force is applied to the brakes of that wheel to equalize the speeds of the driven wheels by transferring driving torque to the other driven wheel.

Figure 2:
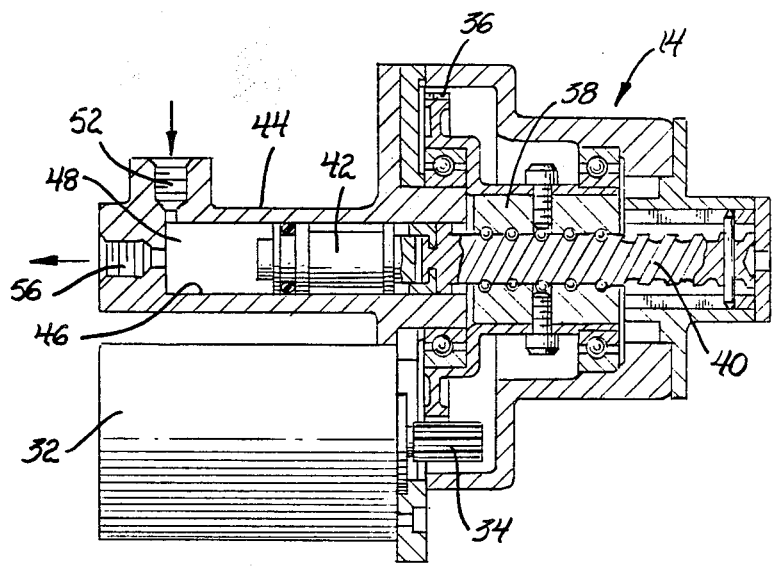
FIG. 2 is a longitudinal cross-sectional view of a brake actuator for modulating the brake pressure in a vehicle wheel.

Referring to FIG. 2, the actuator 14 in the preferred embodiment includes a DC torque motor 32 whose output shaft drives an input gear 34 which in turn rotatably drives an output gear 36. The drive member 38 of a ball screw actuator is secured for rotation with the output gear 36. The drive member 38 engages and axially positions the driven member 40 of the ball screw actuator. The driven member 40 drives a piston 42 to control the hydraulic pressure output of the actuator 14. In summary, the torque output of the motor 32 is translated to a directly related hydraulic pressure output of the actuator 14 that is applied to the respective brake of the vehicle wheels.

As more particularly illustrated in FIG. 2, the actuator 14 includes a housing 44 in which a cylinder 46 is formed. The piston 42 is reciprocally received in the cylinder 46 and defines therewith a chamber 48. The cylinder 46 has an inlet 52 which is connected to the portion 54 of the brake line which operatively connects the master cylinder 16 and the wheel brake 10. The actuator 14 has an outlet 56 from the chamber 48 which is connected by brake line portion 58 to the wheel brake 10.

An actuating mechanism as disclosed will normally operate to control the brake actuating pressure for the wheel brake of one of the vehicle wheels. An actuator 14 is provided in a brake line for each of the remaining three wheels so that the wheel brakes are each independently controlled.

As specifically illustrated in FIG. 3, the electronic controller 22 takes the form of a digital computer 62 and four motor control circuits such as the motor control circuit 64 for controlling the motor in the actuator 14 associated with the right front wheel 12. The digital computer is standard in form and includes a central processing unit (CPU) which executes an operating program permanently stored in a read only memory (ROM) which also stores tables and constants utilized in controlling the hydraulic pressure input to each of the wheel brakes. Contained within the CPU are conventional counters, registers, accumulators, flag flip flops, etc. along with a clock which provides a high frequency clock signal.

The computer 62 also includes a random access memory (RAM) into which data may be temporarily stored and from which data may be read at various address locations determined in accord with the program stored in the ROM. A power control unit (PCU) receives battery voltage and provides regulated power to the various operating circuits in the electronic controller 22.

The computer 62 further includes an input/output circuit (I/O) that in turn includes a discrete output section controlled by the CPU to provide a control signal to the valve 20. In controlling the four wheel brakes, the computer provides digital signals via the I/O to the respective motor control circuits such as the circuit 64 representing a desired value of the hydraulic brake pressure. The four control pressures are the control pressure $P_{cRF}$ for the right front driven wheel 12, the control pressure $P_{cLF}$ for the left front driven wheel brake, the control pressure $P_{cRR}$ for the right rear wheel brake and the control pressure $P_{cLR}$ for the left rear wheel brake.

The respective motor control circuits, such as the circuit 64 for the right front wheel brake, converts the digital signal representing the desired pressure to an analog signal which is compared with the actual measured value of the respective brake pressure signal such as the brake pressure signal $P_{bRF}$ provided by the pressure sensor 30. By standard closed loop adjustment that may include both proportional and integral terms, the actuator motor current is controlled so that the actual measured brake pressure is made equal to the desired pressure. Similarly, the brake pressures $P_{bLF}$ of the left front wheel brake, $P_{bRR}$ of the right rear wheel brake and $P_{bLR}$ for the left rear wheel brake are controlled to respective commanded brake pressures.

The I/O also includes an input counter section which receives the output from the respective signal conditioners such as the signal conditioner 26 representing the right front wheel speed $\omega_{RF}$, the left front wheel speed $\omega_{LF}$, the right rear wheel speed $\omega_{RR}$ and the left rear wheel speed $\omega_{LR}$. The wheel speed signals each take the form of a squarewave signal having a frequency representing the respective wheel speed. Each wheel speed is then determined by counting clock pulses between wheel speed pulses.

An analog-to-digital unit (ADU) is included in the computer 62 which provides for the measurement of analog signals. The analog signals representing conditions upon which the hydraulic brake pressure to each of the wheel brakes is based are supplied to the ADU. In the present embodiment, those signals include the four brake pressure values $P_{bLR}$, $P_{bRR}$, $P_{bLF}$ and $P_{bRF}$ from the respective pressure sensors and the output of the brake pedal force sensor 24 providing a measure of the pedal force F. The analog signals are sampled and converted under the control of the CPU and stored in ROM designated RAM memory locations.

Figure 5A:
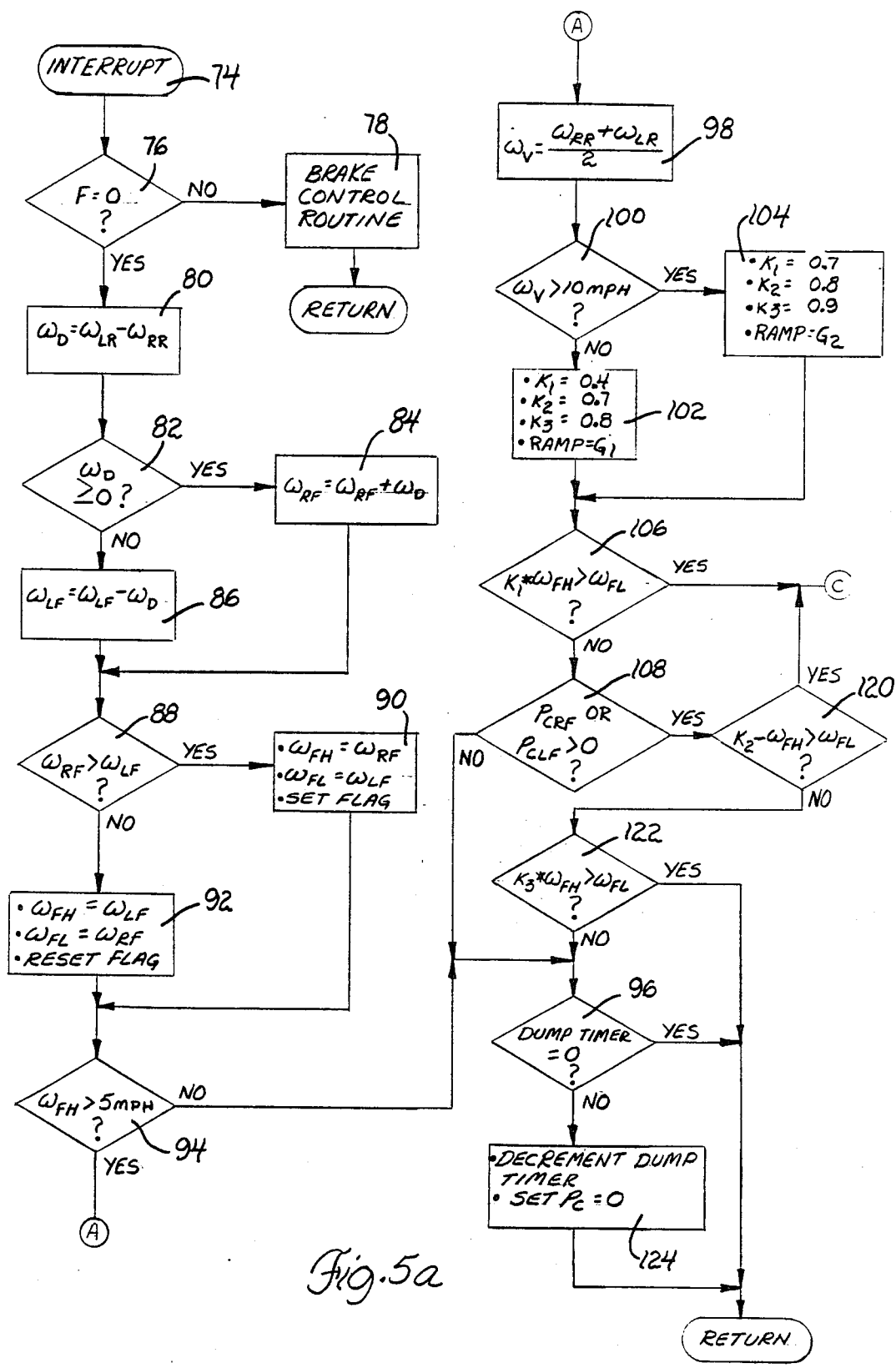

The operation of the electronic controller 22 in controlling the hydraulic brake pressures to the wheel brakes is illustrated in the FIGS. 4, 5a and 5b. Referring first to FIG. 4, when power is first applied to the system such as when the vehicle ignition switch is rotated to its "on" position, the computer program is initiated at point 66 and then proceeds to a step 68 where it provides for system initialization. For example, at this step initial values stored in the ROM are entered into ROM designated RAM memory locations and counters, flags and timers are initialized.

After the initialization step 68, the program proceeds to a step 70 where the program conditions the controller 22 to allow interrupts to occur and then to a background loop 72 which is continuously repeated. This loop may include, for example, diagnostic routines. In the preferred embodiment of this invention, an interrupt is provided by the CPU at 5 millisecond intervals as timed by the internal clock and a counter. Following each interrupt, the execution of the background loop 72 is interrupted and the routines for establishing the hydraulic brake pressures in the respective wheel brakes are executed.

Referring to FIGS. 5a and 5b, the 5 millisecond interrupt routine for controlling wheel slip is illustrated. This routine is entered at point 74 and proceeds to a step 76 where the program determines whether or not the measured value of the force F applied to the brake pedal 18 is zero. If the force is determined to be greater than zero indicating a braking command by the vehicle operator, the program proceeds to a step 78 where a brake control routine is executed. This routine may take the form of the routine illustrated in U.S. application Ser. No. 789,576, filed on Oct. 21, 1985 and assigned to the assignee of this invention. Following execution of the brake control routine, the program returns to the background loop 72 of FIG. 4.

Returning to step 76, if the force applied to the brake pedal 18 is zero indicating the operator is not commanding brake application, the program proceeds to a step 80 where the difference in speed $\omega_D$ between the undriven left and right rear wheel speeds $\omega_{LR}$ and $\omega_{RR}$ is determined. $\omega_D$ will have a value equal to zero if the vehicle is traveling along a straight line since the undriven wheels have no slippage and therefore are at the same speed. However, $\omega_D$ will have a value either less than or greater than zero when the vehicle is turning, the difference being a function of the vehicle turning radius. As will be described, this difference in undriven wheel speeds is utilized to compensate the measured speed of the driven wheels so as to compensate for a variance in the wheel speeds due to the turning of the vehicle.

At the next step 82, the value of $\omega_D$ is compared to zero. If the value is greater than zero indicating the vehicle is turning right so that the left wheel speeds are greater than the right wheel speeds, the program proceeds to a step 84 where the measured value of the right front wheel speed $\omega_{RF}$ is increased by the difference $\omega_D$ between the two undriven wheel speeds. Conversely, if step 82 determines that $\omega_D$ is negative indicating the vehicle is turning left so that the right wheel speeds are greater than the left wheel speeds, the program proceeds to a step 86 where $\omega_D$ is subtracted from the measured speed $\omega_{LF}$ of the left front driven wheel which increases $\omega_{LF}$ by the absolute magnitude of $\omega_D$.

The function of steps 84 and 86 is to adjust or compensate the two driven wheel speeds so that during a condition where neither driven wheel is slipping, the two driven wheel speeds as compensated are equal even when the vehicle is turning. Therefore, a difference in the driven wheel speeds as compensated at steps 84 and 86 represents the difference that is the result of wheel slipping. It can be seen that step 84 alternatively may provide speed compensation by decreasing the measured speed $\omega_{LF}$ of the left front wheel by the absolute value of the difference in the two undriven wheel speeds and step 86 may provide speed compensation by decreasing the measured speed $\omega_{RF}$ of the right front driven wheel speed by the absolute value of the difference in the speeds of the undriven wheels.

Following the step 84 or 86, the program proceeds to a step 88 where the left and front wheel speeds and $\omega_{RF}$ and $\omega_{LF}$ as compensated are compared. If the right front wheel speed is greater than the left front wheel speed indicating the right front wheel is slipping, the program proceeds to a step 90 where the value of $\omega_{FH}$ representing the fastest front wheel speed is set equal to the value of the right front wheel speed $\omega_{RF}$, the value of $\omega_{FL}$ representing the lowest front wheel speed is set equal to the left front wheel speed $\omega_{LF}$ and a flag is set indicating that the right front wheel speed is greater than the left front wheel speed. Conversely, if at step 88 the left front wheel speed is determined to be greater than the right front wheel speed, the program proceeds to a step 92 where $\omega_{FH}$ is set equal to the left front wheel speed $\omega_{LF}$, $\omega_{FL}$ is set equal to the right front wheel speed $\omega_{RF}$ and the flag is reset to indicate that the left front wheel speed is greater than the right front wheel speed.

From step 90 or 92, the program proceeds to a step 94 where the fastest driven wheel speed $\omega_{FH}$ is compared to a calibration constant representing a vehicle speed such as 5 mph. This calibration constant represents a speed below which wheel slip control is inhibited. Assuming this to be the case, the program proceeds to a step 96 where a dump timer is compared to zero. Assuming that the dump timer was reset to zero during the initialization step 68 of FIG. 4, the program exits the routine of FIG. 5 and returns to the background loop 72 of FIG. 4.

Returning to step 94, if the fastest driven wheel speed is greater than the calibration speed, the program proceeds to a step 98 where an estimated vehicle speed $\omega_V$ is determined by an average of the undriven wheel speeds $\omega_{RR}$ and $\omega_{LR}$. The program then proceeds to a step 100 where the estimated vehicle speed is compared to a second calibration constant such as 10 mph. This constant establishes threshold slip values in the control of wheel slip such that wheel slip is limited to lower slip values at higher vehicle speeds than at lower vehicle speeds.

If the estimated vehicle speed is less than the calibration value, the program proceeds to a step 102 where a first constant $K_1$ is set equal to a fraction such as 0.4, a second constant $K_2$ is set equal to a fraction such as 0.7, and a third constant $K_3$ is set equal to a fraction such as 0.8. In addition, a brake pressure ramp gain value is set equal to a value $G_1$. Conversely, if the vehicle speed is greater than the calibration constant, the program proceeds from step 100 to a step 104 where $K_1$ is set equal to a fraction such as 0.7, $K_2$ is set equal to a fraction such as 0.8, and $K_3$ is set equal to a fraction such as 0.9. In addition, the brake pressure ramp gain value is set equal to a gain $G_2$.

From either of the steps 102 or 104, the program proceeds to a step 106 where it determines whether or not the fastest driven wheel speed exceeds the lowest driven wheel speed by an amount determined by the fraction $K_1$. $K_1$ represents a high slip threshold above which it is desired to actuate the brake of the slipping wheel so as to transfer drive torque to the slowest driven wheel. If the slip value does not exceed the amount established by the fraction $K_1$, the program proceeds to a step 108 where it determines if slip control was previously initiated and is in progress based on whether or not brake pressure is being applied to a driven wheel. If the commanded brake pressures $P_{CRF}$ and $P_{CLF}$ are both zero indicating slip control has not been initiated, the program proceeds to the step 96 where the dump timer is again compared to zero. Assuming zero, the program exits the routine and returns to the background loop 72 of FIG. 4.

Returning to step 106, if the speed $\omega_{FH}$ of the fastest driven wheel exceeds the speed $\omega_{FL}$ or the slowest driven wheel by an amount determined by the fraction $K_1$, the program proceeds to a step 110 where the dump timer is initialized to a calibration constant. Thereafter the program proceeds to a step 112 where the state of the flag is sampled. If set indicating that the right front driven wheel is the slipping wheel, the program proceeds to a step 114 where the commanded right front brake pressure $P_{CRF}$ is incremented by the ramp value $G_1$ or $G_2$ that was established at step 102 or step 104. Also at this step the commanded brake pressure $P_{CLF}$ to be applied to the left front wheel brake is set equal to zero.

Returning to step 112, if the flag is reset indicating the left front wheel is slipping, the program proceeds to a step 116 where the commanded brake pressure $P_{CLF}$ to the left front wheel is incremented by the ramp gain constant G1 or G2 as previously described. In addition, the commanded brake pressure $P_{CRF}$ to be applied to the right front wheel brake is set equal to zero. From step 114 or step 116, the program proceeds to a step 118 where the commanded brake pressures established at step 116 or 114 are provided by the I/O of the digital computer of 62 of FIG. 3 to the respective motor control circuit to control the respective right front or left front driven wheel brakes. Following step 118, the routine returns to the background loop 72 of FIG. 4.

The foregoing steps are repeated at the interrupt rate to ramp the brake pressure of the slipping wheel until such time that step 106 senses the wheel slip has decreased to below the value established by the fraction $K_1$. When this condition is sensed, the program proceeds to the step 108 where it determines whether or not a wheel is being braked to control slip. Since a brake pressure to a slipping wheel is being commanded, the program proceeds to a step 120 where it determines whether or not the wheel slip exceeds the slip value established by the second fraction $K_2$. Assuming that the slip exceeds the value established by the constant $K_2$, the program proceeds to step 110 and the subsequent steps to ramp the brake pressure as previously described to further decrease the slip of the fastest driven wheel.

The foregoing sequence of steps are repeated as previously described until such time that the wheel slip decreases to below the slip value established by the fraction $K_2$ after which the program proceeds from step 120 to the step 122. At step 122, the program determines whether or not the slip has decreased to below the lowest threshold value established by the fraction $K_3$. If the slip of the fastest driven wheel is greater than this slip threshold, the program exits the routine and returns to the background loop 72 of FIG. 4. As can be seen, the brake pressure applied to the fastest driven wheel is unadjusted and held at the value that was commanded when the slip was first reduced to the value determined by the fraction $K_2$.

The pressure applied to the slipping wheel is held constant during subsequent executions of the routine of FIG. 5 until the slip of the fastest driven wheel becomes less than the slip established by the fraction $K_3$. When this condition is sensed at step 122, the program proceeds to the step 96 where the dump timer value is compared to zero. Recalling that this timer was initialized at step 110 to a predetermined time value, the program then proceeds to a step 124 where the dump timer is decremented and the commanded brake pressure being applied to the driven wheels are both set to zero. Thereafter, the program returns to the background loop 72 of FIG. 4. The foregoing steps are repeated at the 5 millisecond interrupt interval until such time that the dump timer is decremented to zero after which the program exits the routine from step 96 to the background loop 72 of FIG. 4.

Since the measured driven wheel speeds are adjusted via the steps 80 through 86 so as to be substantially equal in the absence of wheel slip even while the vehicle is being turned, the control of the brake pressure in response to the difference between the wheel speeds (as compensated) is not affected by the difference between the actual driven wheel speeds resulting from the turning of the vehicle. This prevents the application of brake pressure to a wheel unnecessarily at low slip wheel slip values that may result while the vehicle is being turned.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A slip control system for a vehicle having two undriven wheels and first and second wheels driven through a differential, the slip control system comprising, in combination:

means for sensing the speed of each of the driven and undriven wheels;

means for adjusting the sensed speed of the first driven wheel by an amount equal to the difference between the sensed speeds of the undriven wheels and in direction reducing the difference between the sensed driven wheel speeds;

means for determining the difference between the adjusted sensed speed of the first driven wheel and the unadjusted sensed speed of the second driven wheel, the difference (A) representing slipping of the first driven wheel when its adjusted sensed speed is greater than the sensed speed of the second driven wheel and representing slipping of the second driven wheel when its sensed speed is greater that the adjusted sensed speed of the first driven wheel and (B) being a measure of the slip; and means for braking the slipping first or second driven wheel when the difference between the adjusted and unadjusted driven wheel speeds represents a maximum slip value so as to transfer driving torque to the other one of the first and second driven wheels.

2. A slip control system for a vehicle having first and second undriven wheels and first and second wheels driven through a differential, the slip control system comprising, in combination:

means for sensing the speed of each of the first and second drive wheels and the first and second undriven wheels;

means for determining the difference between the sensed speeds of the first and second undriven wheels;

means for adjusting the sensed speed of the first driven wheel by an amount equal to the determined difference between the sensed speeds of the first and second undriven wheels and in direction reducing the difference between the sensed speeds of the first and second driven wheels;

means for determining the difference between the adjusted sensed speed of the first driven wheel and the sensed speed of the second driven wheel, the difference being a measure of the slip of one of the first and second driven wheels; and means for (A) braking the first driven wheel when its adjusted sensed speed is greater than the sensed speed of the second driven wheel and the measure of the slip is greater than a predetermined value and (B) braking the second driven wheel when its sensed speed is greater than the adjusted sensed speed of the first driven wheel and the measure of the slip is greater than the predetermined value, the braking of one of the driven wheels providing for a transfer of driving torque to the other one of the driven wheels to limit wheel slip.

3. A slip control system for a vehicle having two undriven wheels and first and second wheels driven through a differential, the slip control system comprising, in combination:

means for sensing the speed of each of the driven and undriven wheels;

means for adjusting the sensed speed of the first driven wheel by an amount equal to the difference between the sensed speeds of the undriven wheels and in direction reducing the difference between the sensed driven wheel speeds;

means for determining the difference between the adjusted sensed speed of the first driven wheel and the unadjusted sensed speed of the second driven wheel, the difference (A) representing slipping of the first driven wheel when its adjusted speed is greater than the sensed speed of the second driven wheel and representing slipping of the second driven wheel when its sensed speed is greater that the adjusted sensed speed of the first driven wheel and (B) being a measure of the slip; and means for (A) applying a progressively increasing braking force to the slipping driven wheel when the difference between the adjusted and anadjusted driven wheel speeds represents a slip value between an upper wheel slip threshold and a intermediate wheel slip threshold, (B) holding the braking force applied to the slipping driven wheel when the difference between the adjusted and unadjusted driven wheel speeds represents a slip value between the intermediate wheel slip threshold and a lower wheel slip threshold and (C) terminating the braking force applied to the slipping driven wheel when the difference between the adjusted and unadjusted driven wheel speeds represents a slip value less than the lower wheel slip threshold so as to transfer driving torque to the other one of the driven wheels and limit driven wheel slip.

4. The slip control system as set forth in claim 3 further including means to adjust the upper, intermediate and lower wheel slip thresholds as a function of the average sensed speeds of the undriven wheels.

5. For a vehicle having first and second undriven wheels and first and second wheels driven through a differential, the method of controlling the slip of the driven wheels comprising the steps of:

sensing the speed of each of the first and second driven wheels and the first and second undriven wheels;

determining the difference between the sensed speeds of the first and second undriven wheels;

adjusting the sensed speed of the first driven wheel by an amount equal to the determined difference between the sensed speeds of the first and second undriven wheels and in direction reducing the difference between the sensed speeds of the first and second driven wheels;

determining the difference between the adjusted sensed speed of the first driven wheel and the sensed speed of the second driven wheel, the difference being a measure of the slip of one of the first and second driven wheels;

braking the first driven wheel when its adjusted sensed speed is greater than the sensed speed of the second driven wheel and the measure of the slip is greater than a predetermined value; and braking the second driven wheel when its sensed speed is greater than the adjusted sensed speed of the first driven wheel and the measure of the slip is greater than the predetermined value, the braking of one of the driven wheels providing for a transfer of driving torque to the other one of the driven wheels to limit wheel slip.

* * * * *